Aug. 14, 1951     A. J. HORNFECK     2,564,221

ELECTROMAGNETIC MOTION RESPONSIVE DEVICE

Filed Jan. 22, 1948

*INVENTOR.*
ANTHONY J. HORNFECK

BY Raymond D. Jenkins
*ATTORNEY*

Patented Aug. 14, 1951

2,564,221

UNITED STATES PATENT OFFICE 2,564,221

ELECTROMAGNETIC MOTION RESPONSIVE DEVICE

Anthony J. Hornfeck, Lyndhurst, Ohio, assignor to Bailey Meter Company, a corporation of Delaware Application January 22, 1948, Serial No. 3,666

9 Claims. (Cl. 171—777)

This invention relates to devices for producing electrical effects in response to varying conditions, and more particularly to electromagnetic devices having a core member adapted for movement relative to primary and secondary windings in response to varying conditions for effecting corresponding variations in voltages induced in the latter windings.

Many types of electromagnetic motion responsive devices have been proposed and used heretofore for producing and transmitting electrical effects representative of such motion, to instruments which measure the effects as an indication of some variable. Such devices frequently require an extraordinary degree of care in their manufacture and operation, and are even then deficient in certain functional aspects, as by failing to produce a linear output in response to changes in position when the changes are extremely small.

It is sometimes desirable to obtain simultaneously a plurality of effects representative of a variable so that one of the effects may be used to produce an operation that is representative of the variable, while others may be combined in some manner with effects representative of other variables to produce an operation that is representative of a function of the variables. A plurality of effects representative of a single variable may be obtained by positioning a core member relative to a primary winding and a plurality of secondary windings for varying simultaneously by equal amounts the induced voltages in the latter. An electromagnetic device for producing two equal effects may desirably include a primary coil and two pairs of secondary coils magnetically coupled to the primary by a core member movable in response to changes in the variable. The secondary coils may be arranged end to end in pairs which are, in turn, arranged concentrically with a primary coil having an overall length equal to the length of each pair of secondaries. If desired, the secondary coils may be arranged concentrically at opposite ends of the primary and connected in pairs so that each pair includes a winding at each end of the primary. In either case the secondary coils of each pair are desirably connected in series bucking or series aiding relation depending upon the circuit in which they are to be used. With the core member arranged for movement axially of the primary and secondary coils, a uniform field distribution is obtained, and very slight movements of the core produce linear changes in the induced potentials which may be employed for effecting operation of an indicating means.

The displacement of the core member may be effected by any suitable means actuated by devices responsive to pressure, temperature, flow, liquid level, changes in dimensions, or any other variable to be measured. The output of the devices, i. e. the differences between the voltages induced in the windings of each pair of secondaries, may be applied to any suitable and well known electrical circuit to provide either an indication of the condition or an indication of some function of different conditions.

An object of my invention is to provide an improved device for producing electrical effects in response to variable conditions. Another object is to provide an improved motion responsive device having a high degree of sensitivity and accuracy in response to very slight movements. Yet another object is to provide an improved device for producing a measurable effect varying in linear relation with changes in a variable condition. Still another object is to provide a device for producing a plurality of effects representative of a variable condition and varying in linear relation with changes in the condition. A further object is to provide an inductor having a core member movable in response to changes in a variable condition for producing output voltages representative of the condition. Other objects will appear in the course of the following description.

In the accompanying drawing in which there are shown for purposes of illustration, several forms which my invention may assume in practice:

Figs. 3 to 7, inclusive, show other forms of my invention.

Figure 1:
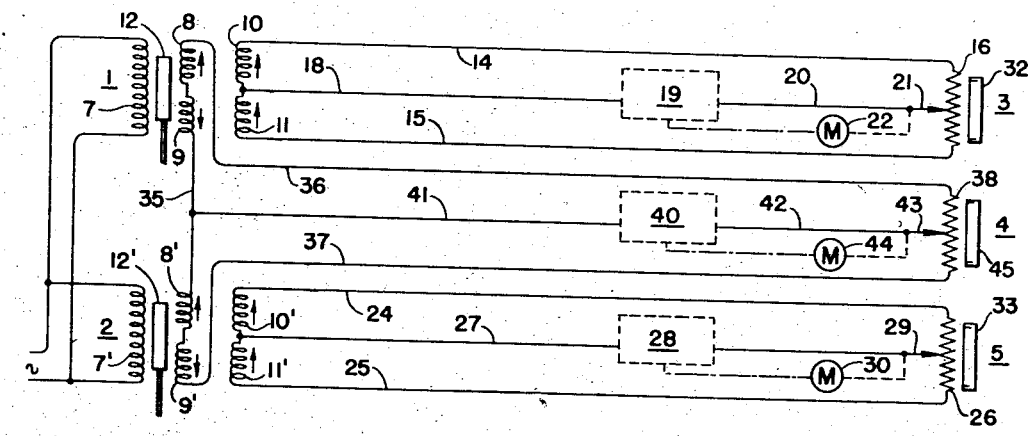
Fig. 1 is a schematic diagram of a system in which my invention is incorporated in one of its forms.

I have shown in Fig. 1 a measuring system which has incorporated therein a pair of my improved motion responsive devices, generally designated 1 and 2, for producing electrical effects that are measured by receivers 3, 4 and 5. Each of the devices 1 and 2 is provided with a primary winding or coil 7 energized from a source of alternating current, two pairs of secondary windings or coils 8, 9 and 10, 11 and a core member 12 adapted to be positioned relative to the windings by some variable condition. The secondary windings 8, 9 are shown herein connected in series bucking, and the windings 10 and 11 connected in series aiding. In order to avoid confusion, the parts of the device 2 have been given primed numbers corresponding to those of the device 1. The secondary windings 10, 11 are connected at remote ends to conductors 14 and 15 leading to opposite ends of a slide wire 16 at the receiver 3, and the adjacent ends of these windings are connected to a conductor 18 leading to an amplifier and motor control device 19 which is connected by a conductor 20 to an adjustable contact 21 of the slide wire. The amplifier and motor control device 19 may be like that disclosed in the Patent 2,275,317 granted to J. E. Ryder on March 3, 1942, for effecting operation of a motor 22 to position the contact 21 when a voltage difference exists between the contact and the point between the secondary windings. A movement of the core member 12 in one direction or the other results in an increase in the induced voltage in one of the secondary windings and a decrease in the voltage induced in the other winding. A voltage then exists between the contact 21 and the conductor 18, and this voltage applied to the device 19 results in an operation of the latter to energizes the motor 22 so that it positions the contact 21 in a direction to reduce the voltage unbalance.

The secondary windings 10' and 11' are connected in a similar manner by conductors 24 and 25 to the ends of a slide wire 26 at the receiver 5, and by a conductor 27 through an amplifier and motor control device 28 to an adjustable contact 29. A motor 30 energized by the device 28 on an unbalance of the circuit, operates to position the contact 29 until the circuit is rebalanced. It will be seen that movements of the core members 12 and 12' effect unbalances of their respective circuits in proportion to the distances moved, and the motors 22 and 30 operate to position the slide wire contacts in proportion to the unbalance. Suitable scales 32 and 33 may be arranged to cooperate with the contacts or other suitable motor actuated indicators for indicating values of the variables positioning the core members.

The pairs of secondaries 8, 9 and 8', 9' are shown connected at one end by a conductor 35, and connected at their other ends by conductors 36 and 37 to opposite ends of a slide wire 38 at the receiver 4. An amplifier and motor control device 40 is connected by conductors 41 and 42 to the conductor 35 and to a contact 43 movable over the slide wire 38. A motor 44 is adapted to be energized by the device 40 for positioning the contact 43. It will be seen that these pairs of secondary windings are connected in opposite branches of a balanceable network, and the device 40 operates on an unbalance of this network to energize the motor 44 for positioning the contact 43 to restore balance. The potential drops across these pairs of secondary windings are representative of the variables positioning their respective core members, and the position of the contact 43 relative to a scale 45 of the receiver 4 is representative of the ratio of the two variables.

It will be understood that the system shown is merely an indication of one way in which my improved motion responsive devices may be used. If desired, the pairs of secondary windings 8, 9 and 8', 9' may be connected in a network that provides an indication of the total, difference or some other function of the variables while the other two pairs of secondary windings are connected either as shown to indicate the value of each variable or in a single network to indicate a function of the variables.

Figure 2:
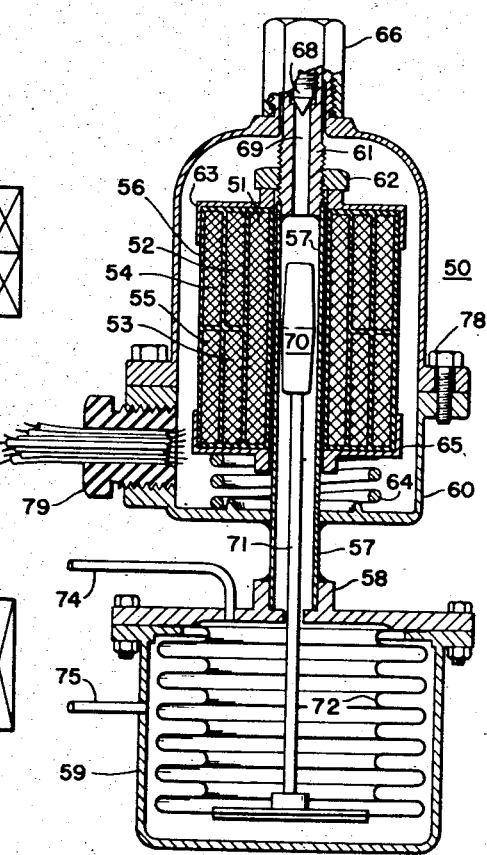
Fig. 2 is a vertical sectional view of a preferred form of my invention arranged for actuation by a pressure responsive means.

Fig. 2 shows one form of my improved motion responsive device, generally designated 50, arranged for operation in response to changes in pressure. This device comprises a primary winding 51, and two pairs of secondary windings 52, 53 and 54, 55, the windings of each pair of secondaries being arranged end to end and each pair being arranged concentrically with the primary winding at the outer side of the latter. The secondary windings are substantially the same in length, and the overall length of each pair of secondaries is substantially the same as the length of the primary winding. A framework 56 of insulating material is provided for separating the windings from each other and for holding them in their respective positions. Extending through an axial opening in the framework is a tubular member 57 of non-magnetic material, and the lower end of this member is supported in a projecting boss portion 58 of a housing 59. Fixed to the tubular member above the housing 59 is another housing 60 for the windings of the device 50. Extending, from the upper end of the tubular member is another member 61, and a nut 62 threaded on the member 61 acts against a cap 63 for the windings to position the latter along the tubular member against the force of a spring 64 acting between the lower end of the housing 60 and a cap 65 for the lower ends of the windings. The member 61 extends into a cap 66 threaded on the upper end of the housing 60 and a plug 68 is threaded into the end of a passage 69 extending longitudinally through the member 61 into the tubular member 57.

Slideably received within the tubular member is a core member 70 of magnetic material, and a stem 71 of non-magnetic material connects the core 70 to a bellows 72 in the housing 59. Conduits 74 and 75 are connected through the housing 59 into communication with the interior and exterior, respectively, of the bellows 72. One of the conduits may be connected to a fluid supply while the other is connected to exhaust, or, if desired, both may be connected to points in a system at different pressure. If liquid is employed as the actuating fluid for the bellows, it is necessary that the plug 68 be removed until the tubular member and the passage 69 are filled with the liquid. This prevents air from becoming trapped in the mechanism and causing any variation of the measured pressure by reason of its compression.

The length of the core member 70 is somewhat less than the length of the primary winding so that it may be moved in either direction from a central position and progressively increase or decrease the magnetic coupling between the primary and secondary windings throughout its full range of travel. It will be seen that its length will be dependent upon the maximum distance that it is to be moved by the pressure variations on the bellows 72. It must be short enough so that neither one of its ends will be moved beyond the ends of the primary winding, and it must be long enough so that neither of its ends will be moved past the inner ends of the secondary windings. A centering of the core member with the windings may be obtained by adjusting the nut 62 to move the windings along the tubular member 57. In order that the parts may be assembled and adjusted, the housing 60 is made in two portions which are clamped together, as by screw 78. A bushing 79 threaded into an opening in the side of the housing 60 provides passage means through which leads from the windings may be extended.

Figure 3:
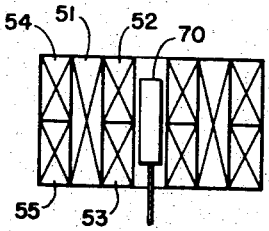
Figure 4:
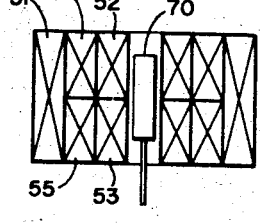

Figs. 3 and 4 show schematically motion responsive devices like that of Fig. 2 except that the windings are arranged in different relative positions. In Fig. 3 the primary winding 51 is shown arranged between the pairs of secondary windings 52, 53 and 54, 55, and Fig. 4 shows the pairs of secondary windings arranged within the primary winding.

Figure 5:
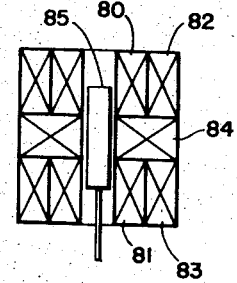

Fig. 5 shows a motion responsive device having two pairs of secondary windings 80, 81 and 82, 83 arranged concentrically at the ends of a primary winding 84. The core member 85 in this case is made somewhat longer than the primary winding, but is shorter than the overall length of the primary and secondary windings. Its length is determined by its maximum required length of travel in the same manner as the length of the core member of Fig. 2 is determined. It must not be so short that one of its ends moves to a point between the ends of the primary winding, and it must not be so long that its ends move beyond the outer ends of the secondary windings.

Figure 6:
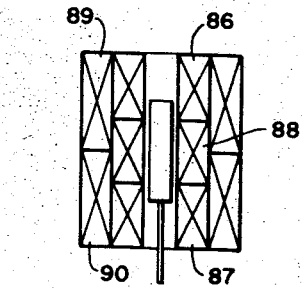

In Fig. 6 one pair of secondary windings 86, 87 is shown having one winding at each end of a primary winding 88, and another pair of secondary windings 89, 90 is shown having its windings arranged end to end and surrounding the primary winding and the first pair of secondaries. The length of the core member in this case is determined in the same manner as in Fig. 5.

Figure 7:
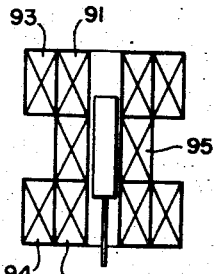

Fig. 7 shows two pairs of secondary windings 91, 92 and 93, 94, and a primary winding 95 arranged in the same manner as Fig. 5. The primary winding in this case, however, is longer and has a smaller cross sectional area than the primary winding of Fig. 5.

In each form of my invention the windings of each pair of secondaries are connected either in series bucking or in series aiding. While Fig. 1 shows one pair of windings connected in series bucking and the other pair connected in series aiding, it will be appreciated that the connections for either one or both could be reversed if the circuit in which it was to be used made it necessary. This application is a continuation-in-part of my application, Serial No. 569,479, filed December 23, 1944, now Patent No. 2,439,891. Although there have been described several forms which my invention may assume in practice, it will be understood that it is not to be limited to these forms but may be modified and embodied in various other forms without departing from the scope of the claims.

What I claim as new, and desire to secure by Letters Patent of the United States, is:

1. An electromagnetic motion responsive device comprising, in combination, a plurality of pairs of secondary windings, the windings of each pair arranged end to end and the pairs of windings arranged concentrically with respect to each other, a primary winding coextensive with said pairs of secondary windings and arranged coaxial therewith, means for energizing said primary winding from a source of alternating current, means for connecting the windings of each pair of secondaries in series, a core member of magnetizable material disposed axially within said windings, the core member and said windings being movable axially relative to each other from positions in which all of said windings are electrically symmetrical to said core member, and the length of the core member being less than the length of the primary winding and at least equal to twice the distance of maximum relative movement of the core member and windings.

2. An electromagnetic motion responsive device comprising, in combination, a plurality of pairs of secondary windings, the windings of each pair arranged end to end and the pairs of windings arranged concentrically with respect to each other, a prmary winding coextensive with said pairs of secondary windings and arranged coaxial therewith, means for energizing said primary winding from a source of alternating current, means for connecting the windings of each pair of secondaries in series, a core member of magnetizable material disposed axially within said windings and being movable in response to changes in a variable condition in either of opposite directions from a position in which it is electically symmetrical with respect to all of said windings, and the length of the core member being less than the length of the primary winding and at least equal to twice its maximum distance of movement in either direction from said symmetrical position.

3. The device of claim 2 in which said primary winding is arranged within said pairs of secondary windings.

4. The device of claim 2 in which said primary winding is arranged between said pairs of secondary windings.

5. The device of claim 2 in which said primary winding is arranged outside of said secondary windings.

6. An electromagnetic motion responsive device comprising, in combination, a plurality of pairs of secondary windings, the windings of each pair arranged in spaced axial alignment and the pairs of windings arranged concentrically with respect to each other, a primary winding arranged between the windings of said pairs and in axial alignment therewith, means for energizing said primary winding from a source of alternating current, means for connecting the windings of each pair of secondary windings in series, a core member of magnetizable material disposed axially within said windings and being movable in response to changes in a variable condition in either of opposite directions from a position in which it is electrically symmetrical with respect to all of said windings, and the length of the core member being greater than the length of the primary coil and so proportioned to the overall length of the primary coil combined with a pair of secondary coils that a movement of the core member from its symmetrical position results in an increase in the flux linkage between the primary winding and one winding of each pair of secondaries and a decrease in the flux linkage between the primary and the other secondary windings.

7. An electromagnetic motion responsive device comprising, in combination, a plurality of pairs of secondary coils, the coils of each pair having equal dimensions and the pairs of coils being arranged concentrically with respect to each other, a primary coil arranged in a position in which it is electrically symmetrical with respect to the coils of each of said pairs of secondaries, means for energizing said primary coil from a source of alternating current, means for connecting the coils of each pair of secondaries in series, a core member of magnetizable material disposed axially within said coils and being movable longitudinally in response to changes in a variable condition in either of opposite directions from a position midway between the ends of the primary coil, and the length of the core member being such that its movement always results in an increase or decrease in the flux linkage between the primary and each of the secondary coils.

8. An electromagnetic motion responsive device comprising, in combination, a plurality of pairs of secondary windings arranged concentrically with respect to each other, the windings of one of said pairs being longitudinally spaced and the windings of another of said pairs being arranged end to end, a primary winding arranged between the windings of said spaced pair of secondaries and in axial alignment therewith, means for energizing said primary winding from a source of alternating current, means for connecting the windings of each pair of secondaries in series, a core member of magnetizable material disposed axially within said windings and being movable in response to changes in a variable condition in either of opposite directions from a position in which it is electrically symmetrical with respect to all of said windings, and the length of the core member being such that movement of the core member results at all times in an increase or decrease in the flux linkage between the primary and each of the secondary windings.

9. An electromagnetic motion responsive device comprising, in combination, a plurality of pairs of secondary windings, the windings of each pair arranged end to end and the pairs of windings arranged concentrically with respect to each other, a primary winding coextensive with said pairs of secondary windings and arranged coaxial therewith, means for energizing said primary winding from a source of alternating current, means for connecting the windings of each pair of secondaries in series, a housing, a tubular member extending axially through said housing, said primary and secondary windings arranged in said housing coaxial with said tubular member, means adjustably supporting said windings for movement longitudinally of said tubular member, a core member slideably received within said tubular member for varying the magnetic coupling between said primary and secondary windings, and means for positioning said core member in response to variations in a condition.

ANTHONY J. HORNFECK.

REFERENCES CITED

The following references are of record in the file of this patent:

UNITED STATES PATENTS

| Number | Name | Date |
| --- | --- | --- |
| 1,561,204 | Beers | Nov. 10, 1925 |
| 1,831,142 | Scharli | Nov. 10, 1931 |
| 1,891,156 | Harrison | Dec. 13, 1932 |
| 2,050,629 | Quereau | Aug. 11, 1936 |
| 2,302,049 | Parker et al. | Nov. 17, 1942 |
| 2,417,049 | Bailey et al. | Mar. 11, 1947 |
| 2,420,539 | Hornfeck | May 13, 1947 |
| 2,430,738 | Schwennesen | Nov. 11, 1947 |
| 2,437,639 | Floyd | Mar. 9, 1948 |